United States Patent [19]

DiGiovanni et al.

[11] Patent Number: 5,430,572
[45] Date of Patent: Jul. 4, 1995

[54] HIGH POWER, HIGH GAIN, LOW NOISE, TWO-STAGE OPTICAL AMPLIFIER

[75] Inventors: David J. DiGiovanni, Montclair; Joseph D. Evankow, Colts Neck; Jonathan A. Nagel, Freehold, all of N.J.; Richard G. Smart, Naperville, Ill.; James W. Sulhoff, Ocean; John L. Zyskind, Shrewsbury, both of N.J.

[73] Assignee: AT&T Corp., Murray Hill, N.J.

[21] Appl. No.: 129,825

[22] Filed: Sep. 30, 1993

[51] Int. Cl.$^6$ ............................................. G02B 6/26
[52] U.S. Cl. .................................. 359/341; 359/337
[58] Field of Search ............ 359/341, 337, 179; 385/24; 372/6

[56] References Cited

U.S. PATENT DOCUMENTS

| | | | |
|---|---|---|---|
| 5,115,338 | 5/1992 | DiGiovanni et al. | 359/337 |
| 5,136,420 | 8/1992 | Inagaki et al. | 359/341 |
| 5,187,610 | 2/1993 | Habbab et al. | 359/341 |
| 5,218,608 | 6/1993 | Aoki | 372/6 |
| 5,233,463 | 8/1993 | Grasso et al. | 359/341 |
| 5,239,607 | 8/1993 | da Silva et al. | 359/341 X |
| 5,253,104 | 10/1993 | Delavaux | 359/341 |

OTHER PUBLICATIONS

"High Gain Two-Stage Amplification With Erbium-Doped Fibre Amplifier", *Electronics Letters*, 10 May 1990, vol. 26, No. 10, H. Masuda et al., pp. 661–662.

*Primary Examiner*—Mark Hellner
*Attorney, Agent, or Firm*—Mark K. Young

[57] ABSTRACT

High output power, high gain, and low noise are achieved in a two-stage optical amplifier, suitable for use as a repeater for a long haul lightwave communication system, in accordance with the principles of the invention, by employing a first amplifying stage having a signal gain sufficiently small to prevent self-saturation by amplified stimulated emission (ASE) that uses counter-propagating pump light to cause maximum inversion of the first stage amplifying medium. In an illustrative embodiment of the invention, EDFAs are used in each of two amplifying stages. The length of the EDFA in the first stage is short enough to ensure nearly complete inversion of the EDFA from pump light that counter-propagates with the signal. The counter-propagating pump light allows the invention to advantageously avoid the significant noise figure penalty from the input loss associated with co-propagating pump light. And, noise figure is improved because complete inversion is achieved throughout the EDFA, and, at the input where the noise figure is most sensitive to inversion. The short length also eliminates self-saturation of the EDFA from ASE which degrades the noise figure. However, the length, and hence the gain, of the EDFA in the first stage is long enough to provide sufficient gain so that the noise figure of the two-stage amplifier, as a whole, is determined primarily by that of the first stage. A second EDFA in the second stage of the amplifier may then be configured using co-propagating or counter-propagating pump light for additional signal amplification to provide the required output power and gain for long haul lightwave systems. Other aspects of illustrative embodiments of the invention include the use of passive optical elements including filters, isolators, and attenuators.

26 Claims, 4 Drawing Sheets

HIGH POWER, HIGH GAIN, LOW NOISE, TWO-STAGE OPTICAL AMPLIFIER

TECHNICAL FIELD

This invention relates generally to optical amplifiers for lightwave communications and, more particularly to a two-stage optical amplifier having high output power, high gain, and low noise.

BACKGROUND OF THE INVENTION

Optical amplifiers in the form of erbium-doped fiber amplifiers (EDFAs) are expected to replace the current optoelectronic regenerators in many future optical long haul terrestrial and undersea lightwave communications systems. Optical amplifiers may be used as power amplifiers to boost transmitter power; as preamplifiers to increase receiver sensitivity; and, as repeaters to periodically boost the signal to a level sufficient for it to traverse the entire lightwave system.

Optical amplifiers are designed by considering a number of parameters including gain, output power, compression (i.e. gain saturation), and noise performance. Noise performance is typically measured by the noise figure which is defined as the signal-to-noise ratio at the input of the optical amplifier divided by that at the output. When optical amplifiers are used as repeaters, they should operate with very low noise figure and high output power in order to maximize the distance between adjacent repeaters in the lightwave system. For example, it would be very desirable, in future lightwave communications systems, to increase the distance between adjacent repeaters from the current 40 km to 100 km, or more. High output power is also required where repeaters are used in systems employing multiple multiplexed channels. In addition, repeaters must have sufficient gain to compensate for the loss in the optical fiber span between repeaters.

One prior art optical amplifier arrangement uses multiple EDFA stages to improve the gain characteristics of the optical amplifier. In this arrangement, two separate stages of amplification are separated by passive optical components. These passive optical components are required elements in most repeater arrangements, and may include isolators, filters, pump multiplexers, and the like. Typically in the prior art, passive optical elements are positioned at either the input or output of the optical amplifier. In this particular prior art arrangement, however, the placement of the passive elements between the two stages allows the multistage amplifier to have high gain while avoiding an increase in noise that would occur if the passive element were placed at the input of a single stage amplifier, or a loss of output power that would result of the elements were placed at the output of a single stage amplifier. Although the prior art multistage optical amplifier operates satisfactorily in certain applications, it has some limitations for use as a repeater in future long haul lightwave communications systems.

SUMMARY OF THE INVENTION

High output power, high gain, and low noise are achieved in a two-stage optical amplifier, suitable for use as a repeater for a long haul lightwave communication system, in accordance with the principles of the invention, by employing a first amplifying stage having a signal gain sufficiently small to prevent self-saturation by amplified stimulated emission (ASE) that uses counter-propagating pump light to cause maximum inversion of the first stage amplifying medium.

In an illustrative embodiment of the invention, EDFAs are used in each of two amplifying stages. The length of the EDFA in the first stage is short enough to ensure nearly complete inversion of the EDFA from pump light that counter-propagates with the signal. The counter-propagating pump light allows the invention to advantageously avoid the significant noise figure penalty from the input loss associated with co-propagating pump light. Noise figure is improved because complete inversion is achieved throughout the the first stage EDFA, and in particular, at the input where the noise figure is most sensitive to inversion. The short length also eliminates self-saturation of the EDFA from ASE which degrades the noise figure. However, the length of the EDFA in the first stage is long enough to provide sufficient gain so that the noise figure of the two-stage amplifier, as a whole, is determined primarily by that of the first stage. A second EDFA in the second stage of the amplifier may then be configured using co-propagating or counter-propagating pump light for additional signal amplification to provide the required output power and gain for long haul lightwave systems. Other aspects of illustrative embodiments of the invention include the use of passive optical elements including filters, isolators, and attenuators.

DETAILED DESCRIPTION

Figure 1:
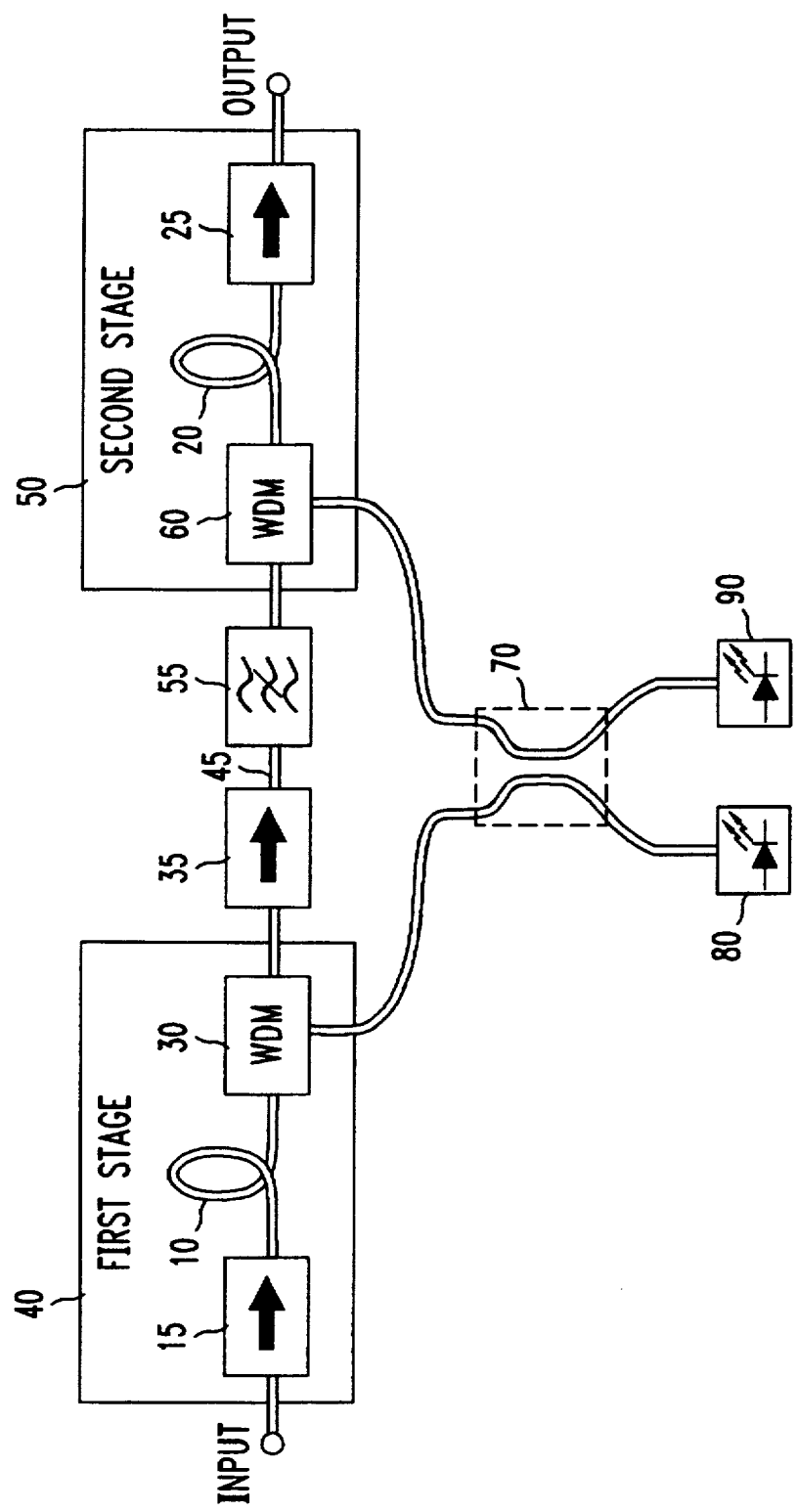
FIG. 1 shows a simplified block diagram of an illustrative arrangement of elements forming a two-stage optical amplifier embodying the principles of the invention.

FIG. 1 shows a simplified block diagram of an illustrative arrangement of elements forming a two-stage optical amplifier embodying the principles of the invention. The optical amplifier has two stages comprising erbium-doped fibers 10 and 20. In first stage 40, wavelength division multiplexer (WDM) 30 permits the introduction of light from a pump source to counter-propagate with respect to a signal which is presented at the input of first stage 40. Optical isolator 15 is positioned between the input of first stage 40 and erbium-doped fiber 10 to suppress reflections and pump light source oscillations. Erbium-doped fibers, WDMs, and optical isolators and the functions employed therein are well known in the art.

Pump light is generated by laser diode 80 at one of any number of wavelengths, for example, 980 nm or 1480 nm. It will be appreciated by those skilled in the art that it may be deskable in some applications of the invention to use a separate laser diode 90 to generate pump light used in second stage 50 of the optical amplifier. Alternatively, a single laser diode may be coupled into splitter 70 to distribute pump light between first stage 40 and second stage 50 of the optical amplifier. Or, laser diodes 80 and 90 could be coupled into splitter 70 for enhanced reliability as pump light would still be introduced into both stages even if one laser diode failed. Splitter 70 could be, in some applications of the invention, a 3 dB splitter. Laser diodes and splitters and the functions employed therein are well known in the art. It will be appreciated by those skilled in the art that it may be in some applications of the invention, to use a splitting ratio other than 50% in splitter 70.

In accordance with an aspect of the invention, the use of counter-propagating pump light in first stage 40 advantageously results in a very low noise figure for the two-stage optical amplifier as a whole, where noise figure is defined as the signal-to-noise ratio at the input of the optical amplifier divided by that at the output. The very low noise figure is realized, in part, because the use of counter-propagating pump light avoids the loss from the WDM at the input of erbium-doped fiber 10 that would result if co-propagating pump light was used in first stage 40. A very low noise figure is further realized by selecting the length of erbium-doped fiber 10 to be sufficiently short so that erbium-doped fiber 10 achieves substantially total inversion from strongly pumped counter-propagating pump light, and erbium-doped fiber 10 experiences little self-saturation by amplified stimulated emission (ASE). The short length assures that erbium-doped fiber 10 has substantially total inversion at its input which is of special importance since the noise figure is most sensitive to the degree of inversion at the input. However, the length of erbium-doped fiber 10 is selected to be long enough to provide sufficient gain through first stage 40 so that the noise figure of the two-stage amplifier, as a whole, is determined primarily by that of first stage 40. For purposes of this example, and not as a limitation on the invention, small signal gains under strong pumping of between approximately 10 and 25 dB in the range of wavelengths between 1540 and 1565 nm have been shown to be effective to ensure that pump light at the input to erbium-doped fiber 10 will be sufficient to maintain a high degree of inversion. The fact that a very low noise figure is achieved with counter-propagating pump light, in accordance with an aspect of the invention, is unexpected and surprising, given that the teachings of the prior art is that co-propagating pump light is used to achieve the good inversion at the input of the erbium-doped fiber necessary for a low noise figure.

First stage 40 and second stage 50 are coupled with coupling fiber 45 so that the amplified signal output from first stage 40 is presented to the input of second stage 50. Isolator 35 and filter 55 are positioned in fiber 45 to ensure that backward-propagating ASE from second stage 50 does not reach first stage 40 which would result in a decrease in inversion at the input to first stage 40 where the backward-propagating ASE power would be the highest, and the noise figure most sensitive to inversion. Filter 55 is tuned to removewavelength components outside the signal band propagating in both directions along coupling fiber 45, which advantageously minimizes self-saturation by ASE in second stage 50. However, it may be deskable in some applications, for filter 55 to be specfically tuned to remove the wavelength component of ASE at 1530 nm and neighboring wavelengths. ASE at 1530 nm and neighboring wavelengths contain the greatest spectral density, often by 10 to 15 dB or more over other wavelengths, and would have the greatest inversion degrading effect because of its strong emission cross section were it not removed by filter 55.

Second stage 50 is comprised of WDM 60 to couple pump light into erbium-doped fiber 20, and isolator 25 which suppresses oscillations and noise figure penalties associated with reflections. WDM 60 is positioned to couple pump light into erbium-doped fiber 20 which co-propagates with the signal to advantageously allow additional signal gain without additional degradation in noise figure. As will be appreciated by those skilled in the art, the length of erbium-doped fiber 20 may be configured so that with strong pumping, substantial gain and output power may be realized. Two-stage amplifiers, built in accordance with the principles of the invention, have demonstrated gain greater than 25 dB, output power greater than 10 dBm, and noise figure below 3.4 dB with 6 dB gain compression and 980 nm pump light from 45 mW lasers.

Figure 2:
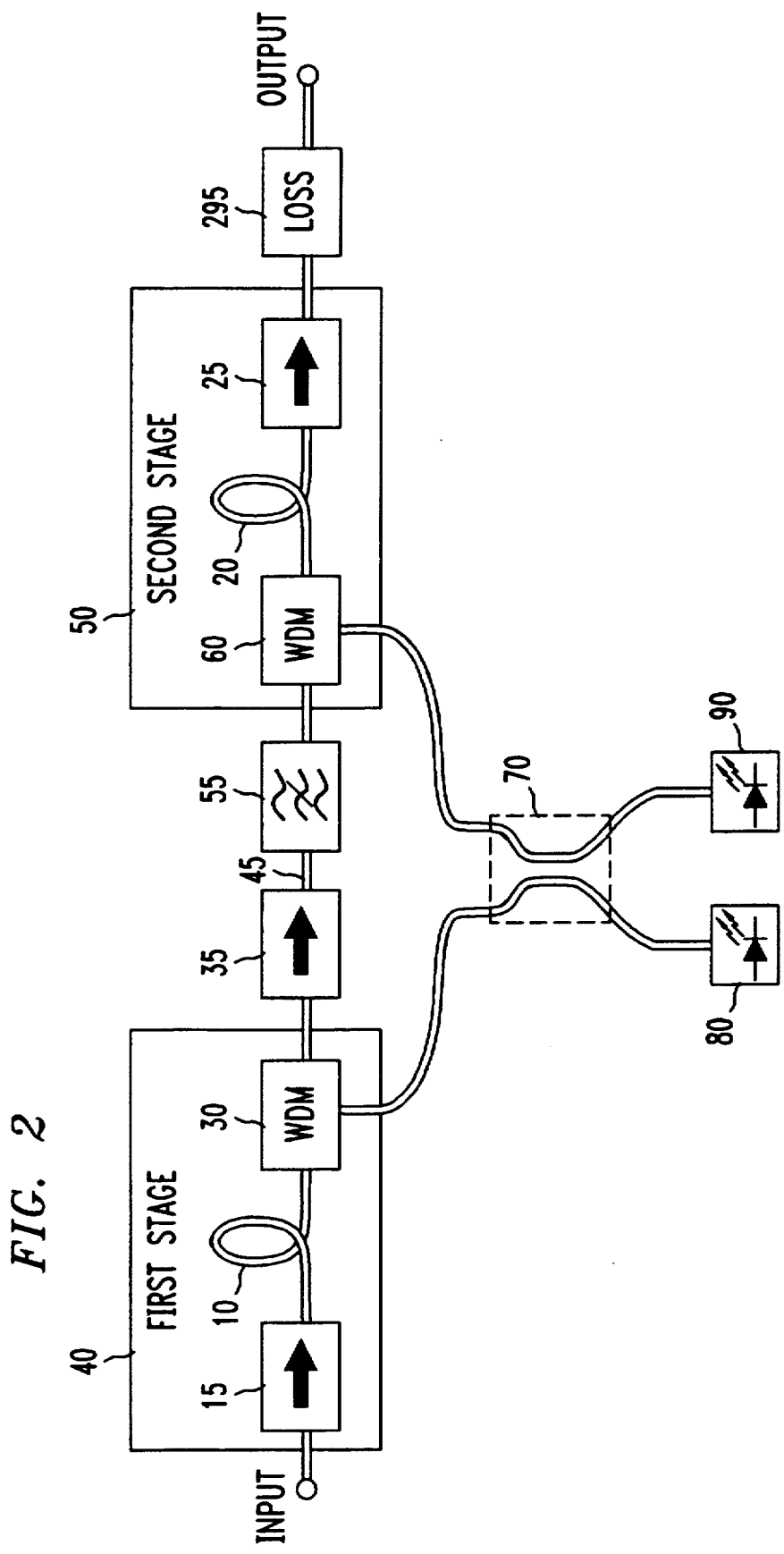
FIG. 2 shows a second arrangement of elements, in accordance with the principles of the invention, including the illustrative embodiment of FIG. 1 in combination with a post second stage attenuation element.

FIG. 2 shows a second arrangement of elements, in accordance with the principles of the invention, including the illustrative embodiment of FIG. 1 in combination with a post second stage attenuation (i.e. loss) element. The addition of loss element 295 advantageously allows the two-stage amplifier to be employed in applications requiring low to moderate output powers such as soliton long haul submarine transmission systems. The addition of loss element 295 allows excess signal power resulting from the high pump power needed for low noise figure to be attenuated in order to avoid penalties associated with nonlinear optical processes in the transmission fiber. However, the gain of the two-stage amplifier must be increased by the amount of the post second stage loss. In the prior art, such gain increase would typically introduce noise due to self-saturation. In accordance with an aspect of the invention, however, maximum benefit may be realized by post second stage loss since self-saturation in first stage 40 is avoided and minimized in second stage 50. At the same time, input losses which directly increase the noise figure are avoided by the counter-propagating pump arrangement in first stage 40.

Figure 3:
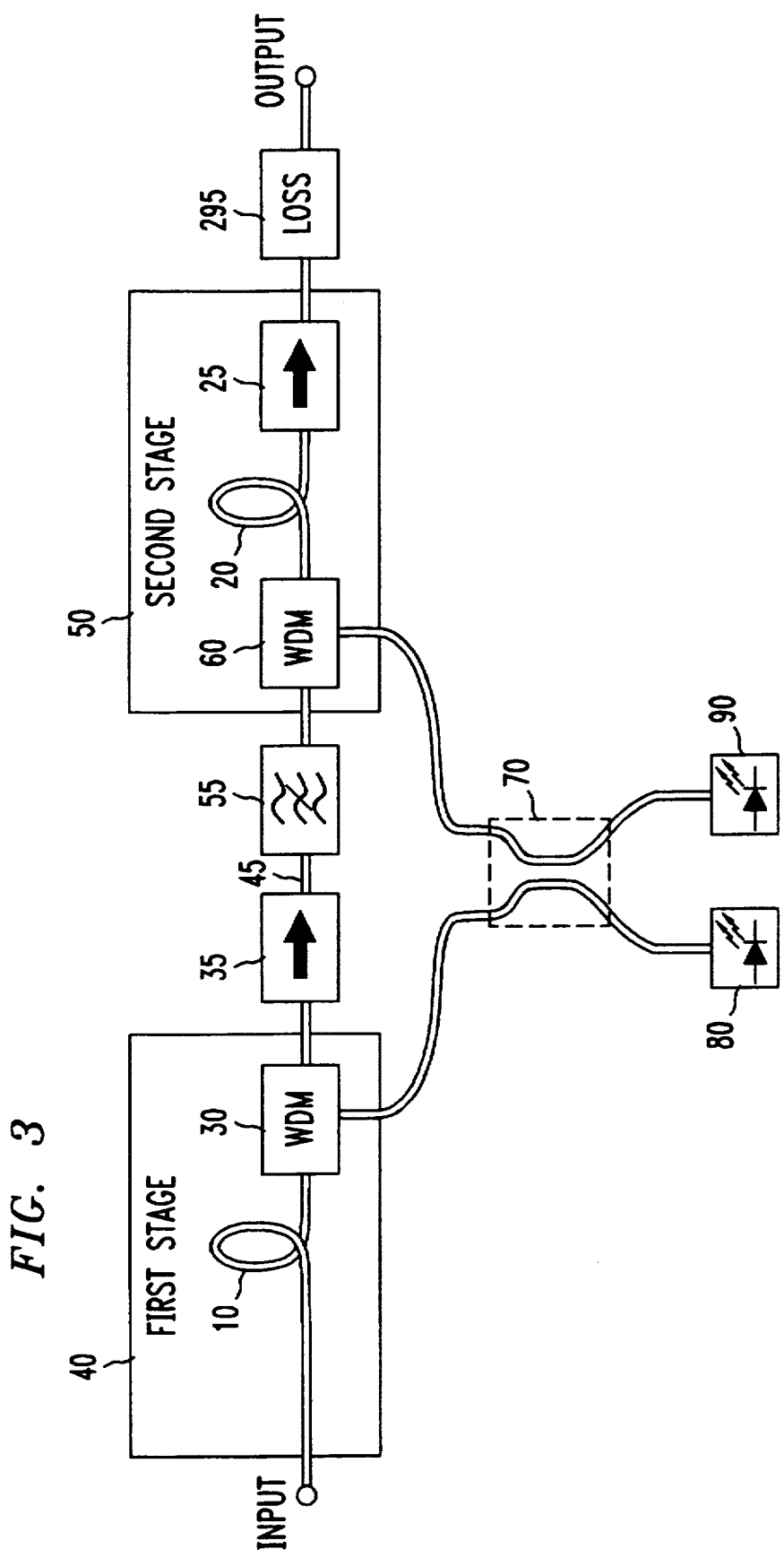
FIG. 3 shows a third arrangement of elements in accordance with the principles of the invention.

FIG. 3 shows a third illustrative arrangement of elements in accordance with the principles of the invention. This arrangement is similar to that shown in FIG. 2, with the exception that the isolator at the input of first stage 40 (FIG. 2) is eliminated. This advantageously lowers input losses even further for an additional benefit to noise figure. In this illustrative arrangement, erbium-doped fiber 10 must be even shorter than those employed in the other illustrative arrangements discussed above, to avoid noise figure penalties and multipath interference associated with any reflections arising upstream of the two-stage amplifier. For example, in long haul systems where the upstream transmission fiber will give rise to Rayleigh scattering induced reflections at a level of about −30 dB, the gain of first stage 40 must be set sufficiently low that multipath interference will not be at a high enough level to degrade performance.

Figure 4:
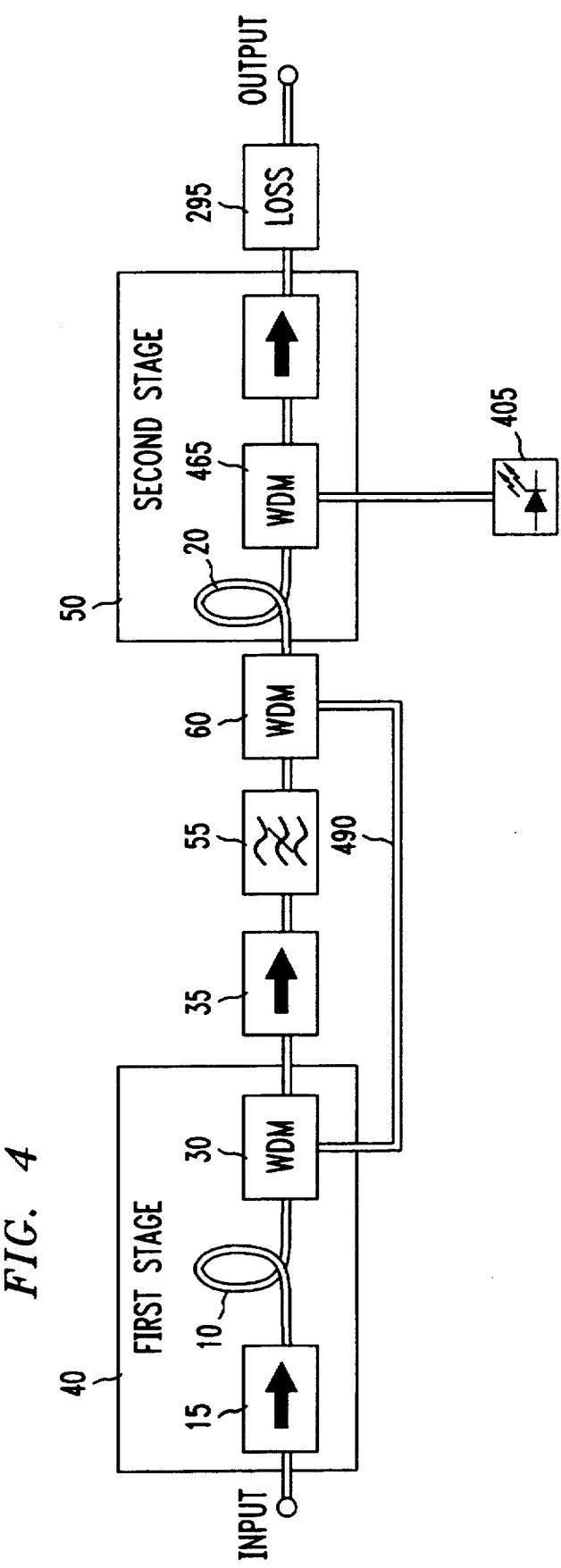
FIG. 4 shows a fourth arrangement of elements in accordance with the principles of the invention.

FIG. 4 shows a fourth arrangement of elements in accordance with the principles of the invention. This arrangement is similar to that shown in FIG. 2 except that a single pump signal from laser diode 405 enters at WDM 465 which counter-propagates through second stage 50. The residual pump power of second stage 50 is then coupled through WDMs 60 and 30 and WDM coupling fiber 490 to first stage 40. Thus, the use of multiple pump light sources and splitters is avoided. Such an arrangement would be suitable for use in applications where high power is not required so that the pump light, even after passing through second stage 50, will still have enough power to ensure a high degree of inversion at the input of first stage 40.

The above-described invention provides a method and apparatus for achieving a high power, high gain, low noise two-stage optical amplifier. It will be understood that the particular methods described are only illustrative of the principles of the present invention, and that various modifications could be made by those skilled in the art without departing from the spirit and scope of the present invention, which is limited only by the claims that follow.

We claim:

1. A two-stage optical amplifier, comprising:
a first fiber amplifier having an input and an output for amplifying an optical signal, said first fiber amplifier having a first prescribed length that is selected to be sufficient to prevent substantial self-saturation by amplified spontaneous emission;
pumping means coupled to said first fiber amplifier for pumping said first fiber amplifier with a predetermined level of counter-propagating pump light to cause said fiber amplifier to achieve substantially total population inversion;
a second fiber amplifier having an input and an output, said second fiber amplifier having a second prescribed length selected to further amplify said optical signal to a predetermined output signal power; and
coupling means for coupling said output of said first fiber amplifier to said input of said second fiber amplifier;
wherein said first prescribed length is further selected so that a noise figure for said two-stage optical amplifier is determined primarily by a noise figure for said first fiber amplifier.

2. The apparatus of claim 1 wherein said first amplifying means comprises an erbium-doped fiber amplifier.

3. The apparatus of claim 1 wherein said second amplifying means comprises an erbium-doped fiber amplifier.

4. The apparatus of claim 2 wherein said predetermined signal gain is substantially equal to a value between 10 and 25 decibels in a range of wavelengths between 1540 and 1565 nanometers.

5. The apparatus of claim 1 further including second pumping means coupled for pumping said second amplifying means with counter-propagating pump light.

6. The apparatus of claim 1 wherein said second amplifying means are coupled to second pumping means for pumping said second amplifying means with co-propagating pump light.

7. The apparatus of claim 4 wherein said coupling means includes isolator means for isolating amplified spontaneous emission in said second amplifying means from said first amplifying means.

8. The apparatus of claim 7 wherein said coupling means includes filtering means for filtering said amplified optical signal to remove wavelength components outside the signal band from said amplified optical signal.

9. The apparatus of claim 7 wherein said coupling means includes filtering means for filtering said amplified optical signal to remove wavelength components substantially equal to 1530 nanometers from said amplified optical signal.

10. The apparatus of claim 9 wherein said second amplifying means includes means for attenuating said further amplified optical signal by a predetermined amount.

11. The apparatus of claim 8 wherein said second amplifying means includes isolator means for isolating said output of said second amplifying means from reflections.

12. The apparatus of claim 11 wherein said first amplifying means includes isolator means for isolating said input of said first amplifying means from reflections.

13. A method for use in a two-stage optical amplifier, comprising the steps of:
amplifying an optical signal in a first fiber amplifier having an input and an output and a first prescribed length selected to be sufficient to prevent substantial self-saturation by amplified spontaneous emission;
pumping said first fiber amplifier with a predetermined level of counter-propagating light so that said first fiber amplifier achieves substantially total population inversion;
further amplifying said optical signal in a second fiber amplifier having an input and an output and a second prescribed length selected so that said optical signal has a predetermined output signal level; and
coupling said output of said first fiber amplifier to said input of said second fiber amplifier;
wherein said first prescribed length is further selected so that a noise figure for said two-stage optical amplifier is determined primarily by a noise figure for said first fiber amplifier.

14. The method of claim 13 wherein said first amplifying stage is comprised of an erbium-doped fiber amplifier.

15. The method of claim 13 wherein said second amplifying stage is comprised of an erbium-doped fiber amplifier.

16. The method of claim 15 wherein said step of amplifying includes amplifying at a signal gain substantially equal to a value between 10 and 25 decibels in a range of wavelengths between 1540 and 1565 nanometers.

17. The method of claim 13 wherein said step of further amplifying includes pumping said second amplifying stage with counter-propagating pump light.

18. The method of claim 13 wherein said step of further amplifying includes pumping said second amplifying stage with co-propagating pump light.

19. The method of claim 18 wherein said step of coupling includes isolating said amplified spontaneous emission in said second amplifying stage from said first amplifying stage.

20. The method of claim 19 wherein said step of coupling includes filtering said amplified optical signal to remove wavelength components outside the signal band from said amplified signal.

21. The method of claim 19 wherein said step of coupling includes filtering said amplified optical signal to remove wavelength components substantially equal to 1530 nanometers from said amplified optical signal.

22. The method of claim 21 wherein said step of further amplifying includes attenuating said further amplified optical signal by a predetermined amount.

23. The apparatus of claim 20 wherein said step of further amplifying includes isolating said output of said second amplifying stage from reflections.

24. The method of claim 23 wherein said step of amplifying includes isolating said input of said first amplifying stage from reflections.

25. The two-stage amplifier of claim 1 wherein said first prescribed length is selected to provide a small signal gain between approximately 10 and 25 dB.

26. The method of claim 13 wherein said first prescribed length is selected to provide a small signal gain between approximately 10 and 25 dB.

* * * * *

UNITED STATES PATENT AND TRADEMARK OFFICE
CERTIFICATE OF CORRECTION

| | | |
|---|---|---|
| PATENT NO. | : 5,430,572 | Page 1 of 1 |
| DATED | : July 4, 1995 | |
| INVENTOR(S) | : David J. DiGiovanni, Joseph D. Evankow, Jonathan A. Nagel, Richard G. Smart, James W. Sulhoff and L. Zyskind | |

It is certified that error appears in the above-identified patent and that said Letters Patent is hereby corrected as shown below:

Title page,
Item [57], ABSTRACT,
Line 6, each occurrence, please replace the word "stimulated" with the word
-- spontaneous --.
Line 7, each occurrence, please replace the word "stimulated" with the word
-- spontaneous --.

Column 1,
Line 68, each occurrence, please replace the word "stimulated" with the word
-- spontaneous --.

Column 2,
Line 4, each occurrence, please replace the word "stimulated" with the word
-- spontaneous --.

Column 3,
Line 26, each occurrence, please replace the word "stimulated" with the word
-- spontaneous --.

Column 4,
Line 12, each occurrence, please replace the word "stimulated" with the word
-- spontaneous --.

Signed and Sealed this

Twenty-third Day of July, 2002

*Attest:*

JAMES E. ROGAN
*Attesting Officer*  *Director of the United States Patent and Trademark Office*